United States Patent
Robert et al.

(10) Patent No.: US 10,201,937 B2
(45) Date of Patent: Feb. 12, 2019

(54) METHOD FOR STIFFENING A CURVED SHEET-METAL PANEL BY MEANS OF A CARDBOARD PANEL

(71) Applicant: ADHEX TECHNOLOGIES, Chenove (FR)

(72) Inventors: Hervé Robert, Montbeliard (FR); Alain Guy, Meroux Moval (FR); Hervé Favata, Binges (FR); Hervé Vion, Auxone (FR)

(73) Assignee: Adhex Technologies, Chenove (FR)

( * ) Notice: Subject to any disclaimer, the term of this patent is extended or adjusted under 35 U.S.C. 154(b) by 183 days.

(21) Appl. No.: 15/031,211

(22) PCT Filed: Sep. 22, 2014

(86) PCT No.: PCT/EP2014/070124
§ 371 (c)(1),
(2) Date: Apr. 21, 2016

(87) PCT Pub. No.: WO2015/058917
PCT Pub. Date: Apr. 30, 2015

(65) Prior Publication Data
US 2016/0263817 A1   Sep. 15, 2016

(30) Foreign Application Priority Data

Oct. 22, 2013  (FR) ..................... 13 60291

(51) Int. Cl.
*B29C 65/50* (2006.01)
*B60R 13/02* (2006.01)
(Continued)

(52) U.S. Cl.
CPC .......... *B29C 65/5057* (2013.01); *B32B 15/00* (2013.01); *B60R 13/0218* (2013.01);
(Continued)

(58) Field of Classification Search
CPC ... B32B 15/10; B32B 2317/127; B32B 15/12; B32B 29/002; B32B 29/06;
(Continued)

(56) References Cited

U.S. PATENT DOCUMENTS 2,284,242 A * 5/1942 Ziemmerman ....... A63F 3/0023
229/930
2,526,270 A * 10/1950 Phillips ................. B42C 11/045
281/21.1
(Continued)

FOREIGN PATENT DOCUMENTS

DE   196 32 054 C1   12/1997
DE   199 49 643 A1   4/2001
(Continued)

OTHER PUBLICATIONS

Written Opinion of the International Searching Authority dated Oct. 28, 2014, issued in corresponding International Application No. PCT/EP2014/070124, filed Sep. 22, 2014, 5 pages.
(Continued)

*Primary Examiner* — Mark A Osele
*Assistant Examiner* — Nickolas R Harm
(74) *Attorney, Agent, or Firm* — Christensen O'Connor Johnson Kindness PLLC

(57) ABSTRACT

A method for stiffening a curved sheet-metal panel, in which a flat cardboard panel is applied to the concave face of the curved sheet-metal panel, includes a step in which a number of parallel cuts that pass partially through the thickness of the cardboard panel are made in that face of the cardboard panel that is intended to be applied to the concave face of the sheet-metal panel. A number of adhesive strips that each cover said parallel cuts are applied to said face of the
(Continued)

cardboard panel and said face, provided with said adhesive strips, of the cardboard panel is applied to said concave face of the sheet-metal panel.

10 Claims, 1 Drawing Sheet

(51) Int. Cl.
*B32B 15/00* (2006.01)
*B32B 29/00* (2006.01)
*B32B 15/12* (2006.01)
*B32B 29/06* (2006.01)

(52) U.S. Cl.
CPC .............. *B29C 65/50* (2013.01); *B32B 15/12* (2013.01); *B32B 29/002* (2013.01); *B32B 29/06* (2013.01); *B32B 2317/12* (2013.01); *B32B 2317/127* (2013.01); *Y10T 156/103* (2015.01); *Y10T 156/1026* (2015.01); *Y10T 156/1028* (2015.01); *Y10T 156/1031* (2015.01); *Y10T 156/1064* (2015.01)

(58) Field of Classification Search
CPC ......... Y10T 156/1026; Y10T 156/1028; Y10T 156/103; Y10T 156/1031; Y10T 156/1064; B29C 65/50; B29C 65/5057
USPC ........ 156/210, 211, 212, 213, 214, 250, 257
See application file for complete search history.

(56) References Cited

U.S. PATENT DOCUMENTS

| | | | | |
|---|---|---|---|---|
| 5,540,443 A * | 7/1996 | Ballan | ................... | A63F 3/0023 273/285 |
| 5,772,569 A * | 6/1998 | Janhonen | ................ | B65D 75/38 493/128 |
| 5,797,832 A * | 8/1998 | Ong | .......................... | B31C 1/00 108/51.3 |
| 6,552,780 B1 * | 4/2003 | Michlin | ............. | G03G 15/0894 399/106 |
| 7,438,321 B2 * | 10/2008 | Peleman | ................ | B42D 3/002 281/21.1 |

FOREIGN PATENT DOCUMENTS

| | | | | |
|---|---|---|---|---|
| DE | 19949643 A1 * | 4/2001 | ......... | B29C 44/5654 |
| EP | 0 712 766 A1 | 5/1996 | | |
| WO | 2007/025707 A1 | 3/2007 | | |

OTHER PUBLICATIONS

International Preliminary Report on Patentability dated Apr. 26, 2016, issued in corresponding International Application No. PCT/EP2014/070124, filed Sep. 22, 2014, 1 page.

International Search Report dated Oct. 28, 2014, issued in corresponding International Application No. PCT/EP2014/070124, filed Sep. 22, 2014, 5 pages.

Written Opinion dated Oct. 28, 2014, issued in corresponding International Application No. PCT/EP2014/070124, filed Sep. 22, 2014, 4 pages.

* cited by examiner

METHOD FOR STIFFENING A CURVED SHEET-METAL PANEL BY MEANS OF A CARDBOARD PANEL The present invention relates to a method for stiffening a curved sheet-metal panel, in which a flat cardboard panel is applied on the concave inner face of the curved sheet-metal panel.

The invention in particular relates to the application of the method according to the invention to the stiffening of a sheet-metal part, such as the roof of a motor vehicle.

Motor vehicle roofs are generally made from sheet-metal.

Due to the small thickness of the sheet-metal, these roofs have an insufficient thickness.

It is consequently necessary to increase the thickness of these roofs.

One known method consists of fixing a flat cardboard panel on the concave inner face of the sheet-metal roof.

Figure 1:
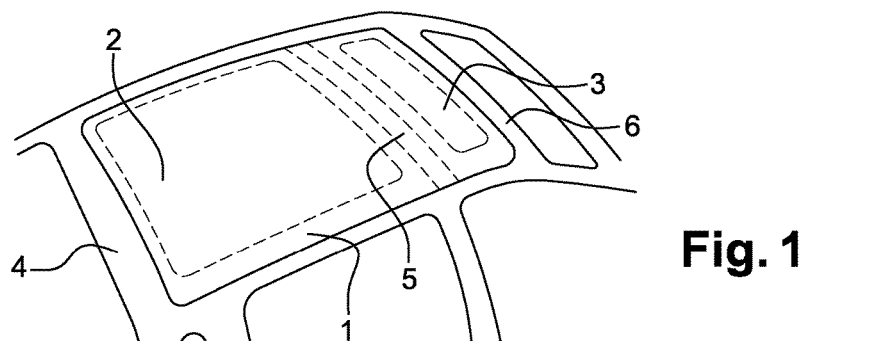

FIG. 1 is a perspective view partially showing the body of a motor vehicle.

Below the roof 1 of this body, two cardboard panels 2, 3 are shown in dotted lines.

The larger of these cardboard panels 2, 3 is fixed between the rear crosspiece 4 and the middle crosspiece 5.

The other cardboard panel 3 is fixed between the crosspiece 5 and the front crosspiece 6.

Prior to the placement of the cardboard panel(s), double-sided adhesive strips are glued thereon so that the strips can adhere to the cardboard and to the sheet-metal of the roof.

However, in light of the thickness of the cardboard panel, the latter tends to return to its initial horizontal position.

Consequently, the adhesion of the strips tends to let go.

Likewise, most of the time, deformations of the sheet-metal of the roof can be seen that are caused during placement of the cardboard panel.

These deformations are harmful to the appearance quality of the roof and are consequently unacceptable.

The aim of the present invention is to resolve the drawbacks of the above known method.

This aim is achieved, according to the invention, using a method for stiffening a curved sheet-metal panel in which a flat cardboard panel is applied on the concave face of the curved sheet-metal panel, characterized by the following steps:
a) a series of parallel cuts that pass partially through the thickness of the cardboard panel are made in that face of the cardboard panel that is intended to be applied to the concave face of the sheet-metal panel,
b) a series of adhesive strips respectively covering said parallel cuts is applied to said face of the cardboard panel,
c) said face of the cardboard panel provided with adhesive strips is applied on said concave face of the sheet-metal panel.

These cuts give the cardboard panel flexibility such that the latter can, during its application against the sheet-metal panel, adapt to the curved surface thereof without creating deformations.

Furthermore, in light of the cuts, the cardboard panel no longer tends to return to its flat shape and the strips no longer risk detaching from the sheet-metal panel.

Preferably, the adhesive strips are centered on the respective cuts, which makes it possible to distribute the adhesion of the strips on either side of the cuts in a balanced manner.

Also preferably, the cardboard panel comprises three parallel sheets separated from one another by a corrugated sheet, the cuts passing through two of said parallel sheets as well as the corrugated sheet comprised between them.

As a result, the parts of the cardboard panel remain connected on either side of the cuts, at least owing to the third sheet.

In the case of a roof, the sheet-metal panel is substantially rectangular and is concave in the direction of its length and in the direction of its width.

In this case, on the concave face of the cardboard panel, two series of cuts are made, one of the series being oriented in the direction of the length of the panel and the other being oriented in the direction of the width of this panel.

In this case, the cardboard panel is flexible in both directions and consequently, during its placement, it perfectly marries the concave side of the sheet-metal panel in the direction of its length and its width, without creating deformation of the sheet-metal, or a risk of detachment of the cardboard.

In the case above, preferably, only the series of cuts made in one of the two directions is covered by adhesive strips.

Also preferably, the series of cuts covered by adhesive strips is the series of cuts oriented in the direction of the length of the cardboard panel.

In one particularly advantageous version, step c) of the method is carried out by placing the cardboard panel provided with adhesive strips flat in a basin whereof the peripheral edge is applied tightly against the concave face of the sheet-metal panel, and creating a vacuum in the basin sufficient for the cardboard panel to press against the sheet-metal panel and to adhere thereto using the adhesive strips.

According to another aspect, the invention also relates to the application of the method according to the invention to the stiffening of a sheet-metal part of a motor vehicle.

This sheet-metal part can be the roof.

In this application, the cardboard, aside from its function of stiffening the roof, also has an acoustic function with respect to road noise, rain noise, etc.

The present invention also relates to a stiffening panel for a curved sheet-metal panel, said stiffening panel being obtained from cardboard and intended to be applied on the concave face of the curved sheet-metal panel, characterized in that it comprises a series of parallel cuts passing partially through the thickness of the cardboard panel from the upper face of the cardboard panel and a series of adhesive strips respectively covering said parallel cuts.

Preferably, the adhesive strips are centered on the respective cuts.

Advantageously, the cardboard panel comprises three parallel sheets separated from one another by a corrugated sheet, the cuts passing through two parallel sheets as well as the corrugated sheet being comprised between them.

In one alternative, the upper face of the cardboard panel includes two series of cuts, one of these series being oriented in the direction of the length of the panel and the other being oriented in the direction of the width of this panel. Advantageously, only the series of cuts made in one of the two directions is covered by adhesive strips. Furthermore, the series of cuts covered by adhesive strips is preferably the series of cuts oriented in the direction of the length of the cardboard panel.

Other particularities and advantages of the invention will also appear throughout the description below.

Figure 2:
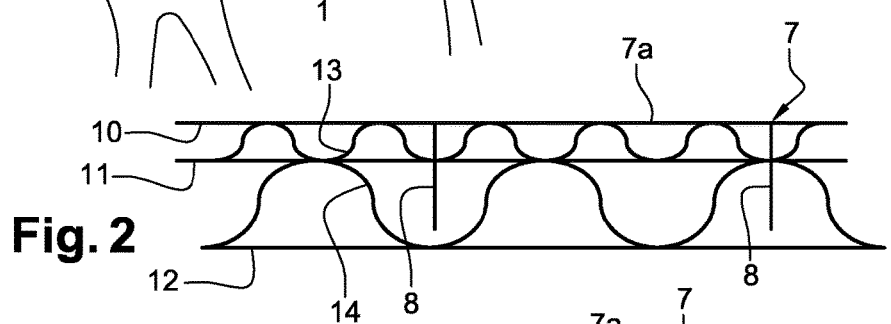
Figure 3:
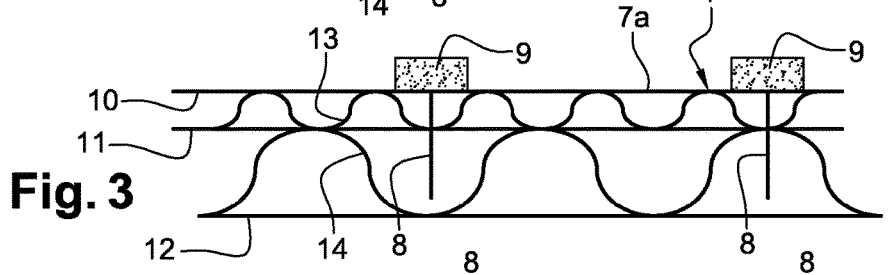
Figure 4:
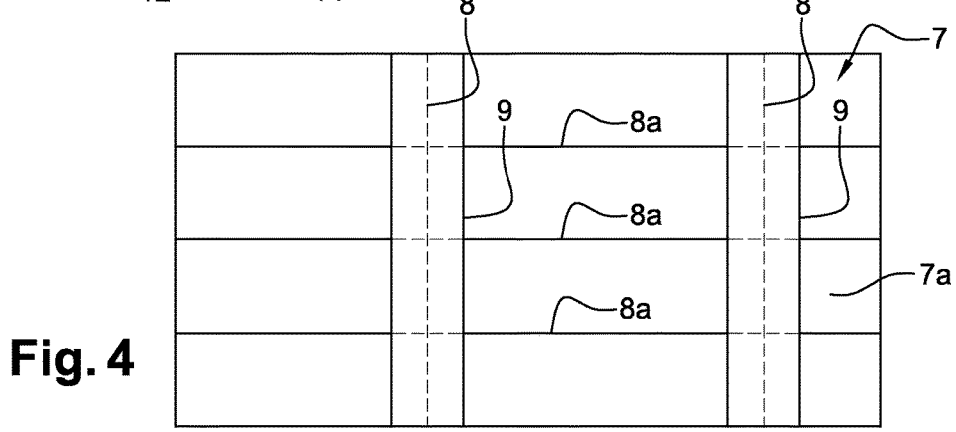
Figure 5:
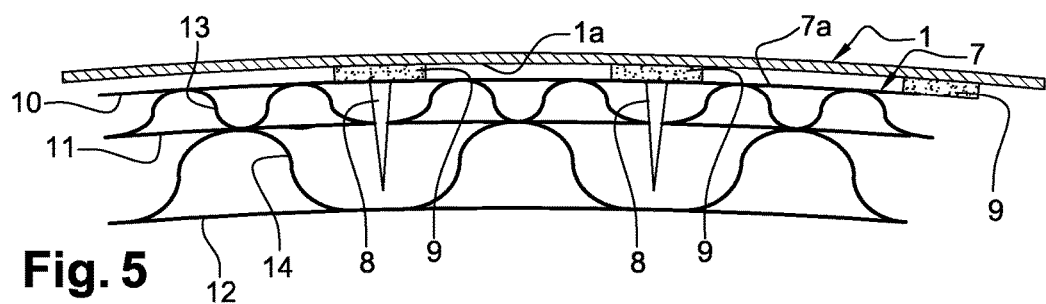

In the appended figures, provided as non-limiting examples:

FIG. 1 is a partial perspective view of the body of a motor vehicle;

FIG. 2 is a cross-section of the cardboard used to stiffen the roof of a motor vehicle showing the first step of the method according to the present disclosure, FIG. 3 is a view similar to FIG. 2 showing a subsequent step of the method according to the present disclosure, FIG. 4 is a top view of the cardboard shown in FIG. 3; and FIG. 5 is a sectional view similar to FIG. 3 showing the cardboard positioned below the roof of a motor vehicle.

FIGS. 2 and 3 show a sectional view of the cardboard panel 7 before it is applied on the concave inner face of the sheet-metal roof 1 of a motor vehicle.

As shown in FIG. 2, in a first step of the method according to the invention, a series of parallel cuts 8 passing partially through the thickness of the cardboard panel 7 is produced on the face 7a of the cardboard panel 7 that is intended to be applied on the concave inner face of the sheet-metal roof 1.

In a following step, shown in FIGS. 3 and 4, a series of adhesive strips 9 respectively covering the parallel cuts 8 is applied on the face 7a of the cardboard panel 7.

These adhesive strips 9 are preferably centered on the cuts 8 (see FIG. 4).

The face 7a of the cardboard panel provided with the adhesive strips 9 is then applied (see FIG. 5) on the concave inner face 1a of the sheet-metal roof 1.

In the example illustrated by FIGS. 2, 3 and 5, the cardboard panel 7 comprises three parallel sheets 10, 11, 12 separated from one another by a corrugated sheet 13, 14.

Furthermore, the cuts 8 pass through two parallel sheets, i.e., the sheets 10, 11, as well as the corrugated sheet 13 comprised between them.

The sheet-metal panel 1 of a motor vehicle is substantially rectangular and is concave in the direction of its length and in the direction of its width.

In this case, two series of cuts 8 and 8a are made on the face 7a of the cardboard panel 7.

The series of cuts 8 is oriented in the direction of the length of the panel 7, and the other series of cuts 8a is oriented in the direction of the width of this panel 7, as shown in FIG. 4.

In this example, only the series of cuts 8 made in one of the two directions is covered by adhesive strips 9.

Furthermore, the series of cuts 8 covered by the adhesive strips 9 is the series of cuts oriented in the direction of the length of the cardboard panel 7.

The step of the method, as illustrated in FIG. 5, is preferably carried out by placing the cardboard panel 7 provided with adhesive strips 9 flat in a basin (not shown) whereof the peripheral edge is applied tightly against the concave face 1a of the sheet-metal roof 1 and creating, in the basin, a sufficient vacuum for the cardboard panel 7 to be applied against the sheet-metal roof 1 and to adhere thereto owing to the adhesive strips 9.

FIG. 5 shows that during this step, the cardboard panel 7 marries the concave surface of the roof 1 owing to the cuts 8 and 8a.

This FIG. 5 in fact shows that the cuts 8 can open due to the concavity of the roof due to the elasticity of the adhesive strips 9, which flatten between the roof 1 and the cardboard panel due to the forces involved.

Thus, the application of the cardboard panel 7 does not exert any excessive force on the roof 1, and the latter does not undergo any damage during implementation of the method according to the invention.

Of course, the invention is not limited to stiffening sheet-metal roofs of motor vehicles, but may apply to the stiffening of any curved sheet-metal panel.

The invention claimed is:

1. A method for stiffening a curved sheet-metal panel in which a flat cardboard panel is applied on a concave face of the curved sheet-metal panel, wherein:
    (a) a series of parallel cuts that pass partially through the thickness of the cardboard panel is made in a face of the cardboard panel that is intended to be applied to the concave face of the sheet-metal panel,
    (b) a series of elastic adhesive strips respectively covering said parallel cuts is applied to said face of the cardboard panel; and
    (c) said face of the cardboard panel provided with adhesive strips is applied on said concave face of the sheet-metal panel.

2. The method according to claim 1, wherein the adhesive strips are centered on the respective cuts.

3. The method according to claim 1, wherein the cardboard panel comprises three parallel sheets separated from one another by a corrugated sheet, the cuts passing through two of said parallel sheets as well as the corrugated sheet comprised between them.

4. The method according to claim 1, wherein:
    (a) the sheet-metal panel is substantially rectangular and concave in the direction of its length and in the direction of its width; and
    (b) two series of cuts are made on said face of the cardboard panel intended to be applied on the concave face of the cardboard panel, one of the series being oriented in the direction of the length of the panel and the other being oriented in the direction of the width of this panel.

5. The method according to claim 4, wherein only the series of cuts made in one of the two directions is covered by adhesive strips.

6. The method according to claim 5, wherein the series of cuts covered by adhesive strips is the series of cuts oriented in the direction of the length of the cardboard panel.

7. The method according to claim 1, wherein step c) of the method is carried out by placing the cardboard panel provided with said adhesive strips flat in a basin whereof the peripheral edge is applied tightly against the concave face of the sheet-metal panel, and creating a vacuum in the basin sufficient for the cardboard panel to press against the sheet-metal panel and to adhere thereto using the adhesive strips.

8. A stiffening panel for a curved sheet-metal panel, said stiffening panel comprising a cardboard panel configured to be applied on a concave face of the curved sheet-metal panel, wherein the stiffening panel further comprises a series of parallel cuts passing partially through the thickness of the cardboard panel from an upper face of the cardboard panel and a series of elastic adhesive strips respectively covering said parallel cuts.

9. The stiffening panel according to claim 8, wherein the adhesive strips are centered on the respective cuts.

10. The stiffening panel according to claim 8, wherein the cardboard panel comprises three parallel sheets separated from one another by a corrugated sheet, the cuts passing through two parallel sheets as well as the corrugated sheet being comprised between them.

* * * * *